United States Patent
Nagaraju

(10) Patent No.: US 10,057,319 B2
(45) Date of Patent: Aug. 21, 2018

(54) METHOD AND APPARATUS FOR PROVIDING APPLICATIONS IN A WEBPAGE

(71) Applicant: Samsung Electronics Co., Ltd., Gyeonggi-do (KR)

(72) Inventor: Samudrala Nagaraju, Bangalore (IN)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 14/483,782

(22) Filed: Sep. 11, 2014

(65) Prior Publication Data

US 2015/0074225 A1 Mar. 12, 2015

(30) Foreign Application Priority Data

Sep. 11, 2013 (IN) .......................... 4055/CHE/2013
Sep. 1, 2014 (KR) ....................... 10-2014-0115034

(51) Int. Cl.
*H04L 29/08* (2006.01)
*H04W 4/60* (2018.01)
*H04L 29/12* (2006.01)
*H04W 4/00* (2018.01)

(52) U.S. Cl.
CPC .............. *H04L 67/02* (2013.01); *H04L 61/30* (2013.01); *H04L 61/35* (2013.01); *H04L 67/34* (2013.01); *H04W 4/003* (2013.01); *H04W 4/60* (2018.02)

(58) Field of Classification Search
CPC ......... H04L 67/02; H04L 67/34; H04W 4/003
USPC ....................................................... 709/217
See application file for complete search history.

(56) References Cited

U.S. PATENT DOCUMENTS

| 8,826,145 B1* | 9/2014 | Kirkpatrick ....... G06F 17/30867 715/239 |
| 9,742,661 B2* | 8/2017 | Klais ...................... H04L 45/22 |
| 2006/0031398 A1* | 2/2006 | Hirao ................ G06F 17/30873 709/217 |
| 2010/0205274 A1* | 8/2010 | Gharabally ............... G06F 8/61 709/217 |
| 2012/0036226 A1* | 2/2012 | Chor ................. G06F 17/30879 709/219 |
| 2012/0290583 A1* | 11/2012 | Mahaniok ................. G06F 8/60 707/741 |
| 2012/0303568 A1* | 11/2012 | Michel ............. G06F 17/30867 706/46 |
| 2012/0303695 A1* | 11/2012 | Michel .................... H04W 4/18 709/203 |
| 2013/0085886 A1 | 4/2013 | Satish et al. |

(Continued)

*Primary Examiner* — Patrice L Winder
*Assistant Examiner* — Aye M Aung
(74) *Attorney, Agent, or Firm* — The Farrell Law Firm, P.C.

(57) ABSTRACT

A method and apparatus for providing applications in a rendered output of a webpage are provided. A request for accessing web content from a user device is received. The request includes information associated with the user device. The information associated with the user device includes information regarding an operating system version of the user device, a type of browser, a type of service operator, and device manufacturer of the user device. Based on the information, one or more applications from one or more application stores are obtained. Accordingly, the one or more applications obtained from the one or more application stores are rendered along with web content on a web page.

10 Claims, 7 Drawing Sheets

(56) References Cited

U.S. PATENT DOCUMENTS

| | | | | |
|---|---|---|---|---|
| 2013/0219381 A1* | 8/2013 | Lovitt | ............... | G06F 8/65 |
| | | | | 717/173 |
| 2013/0325340 A1* | 12/2013 | Forstall | ............. | G01C 21/00 |
| | | | | 701/533 |
| 2014/0108451 A1* | 4/2014 | Lee | ............ | G06Q 30/0601 |
| | | | | 707/770 |
| 2014/0130134 A1* | 5/2014 | Arora | ............... | G06F 21/00 |
| | | | | 726/4 |

\* cited by examiner

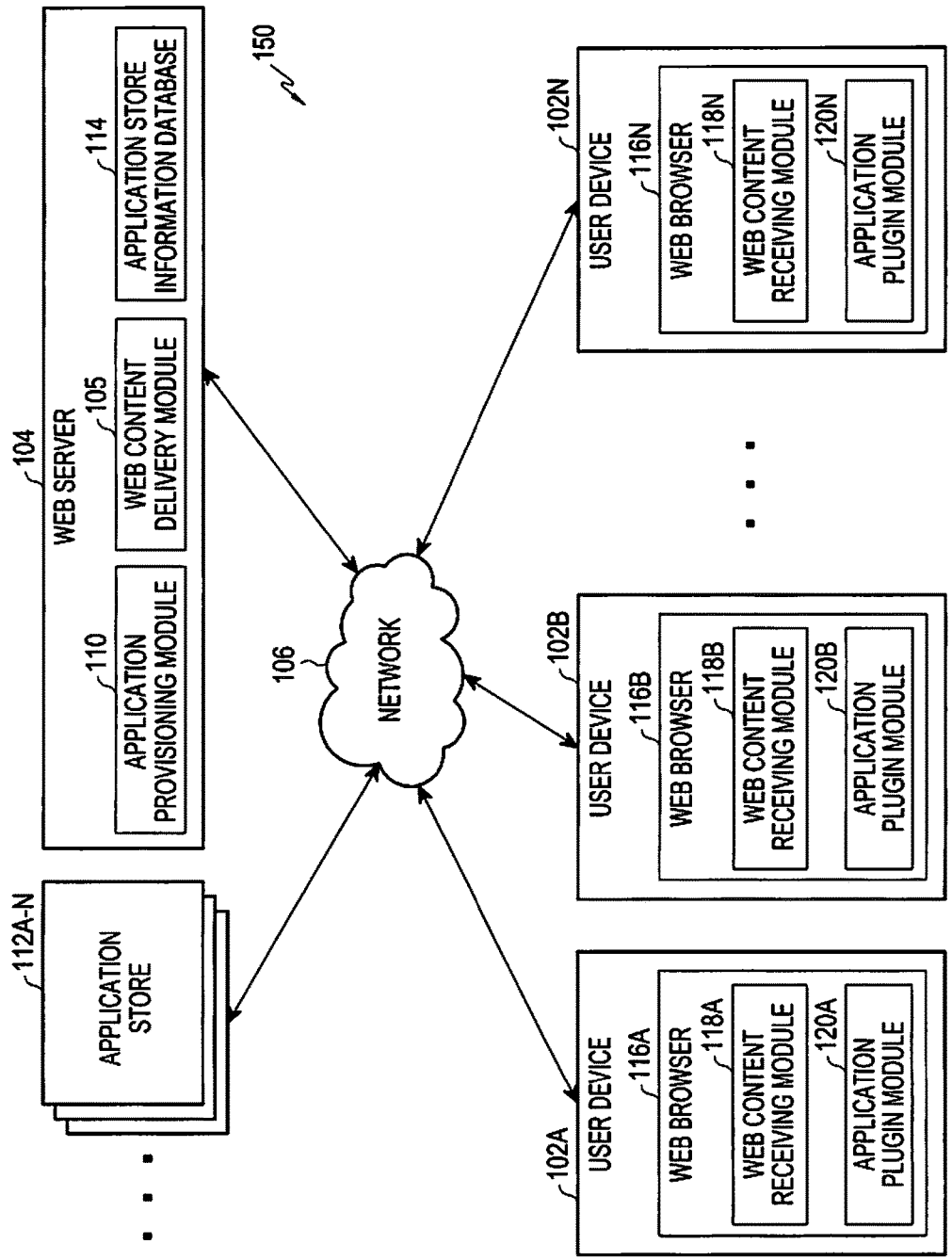

METHOD AND APPARATUS FOR PROVIDING APPLICATIONS IN A WEBPAGE

PRIORITY

This application claims priority under 35 U.S.C. § 119(a) to an Indian Patent Application filed on Sep. 11, 2013 in the Indian Patent Office and assigned Serial No. IN 4055/CHE/2013, and to a Korean Patent Application filed on Sep. 1, 2014 in the Korean Intellectual Property Office and assigned Serial No. 10-2014-0115034, the entire content of each of which is incorporated herein by reference.

BACKGROUND

1. Field of the Invention

The present invention generally relates to the Internet, and more particularly, to a method for providing applications in a rendered output of a web page.

2. Description of the Related Art

A web page allows a user to view content on a website provided by a content provider. Various objects created by content providers and developers can be embedded into third party websites. The object may simply be a text, multimedia content, etc. For example, the user may want to read news from a social website. Once the social website receives the request from the user, a web page containing news will be provided to the user. However, in order to view the multimedia content associated with the news, certain plugins must be installed by the user. Apart from news content, other applications such as advertisements, online shopping sites, and trailers of films are also embedded in the web page while providing the news content to the user. All these applications are embedded in the web page as a plugin. A plugin may include a software component embedded in a web page of a website to render web page content along with audio and video component associated with the web content. Accordingly, objects including multimedia content can be accessed by users with the activation of plugins such as a flash player.

The content providers also approach the third party websites to promote their product through advertisements. For example, a travel agency may tie-up with a social networking website to publish information regarding their services. So when a user logs into the social networking website, the advertisement about the travel agency will be displayed to the user. If the user is interested in planning for a trip, the user can view the advertisement and book the trip. Similarly, games, online shopping sites, and travel agents sites can be embedded into a third party website to attract the visitors of the web page without the need for separately logging in to the respective websites.

SUMMARY

The present invention had been made to at least partially solve, alleviate, or remove at least one of problems and/or disadvantages described above and to provide at least the advantages described below.

Accordingly, an aspect of the present invention provides a method for providing applications in a web page, in which an application/applications existing in an application store may be displayed on an external website, instead of in the application store, by using a web plugin scheme.

Another aspect of the present invention provides an apparatus for providing applications in a web page, in which an application/applications existing in an application store may be displayed on an external website, instead of in the application store, by using a web plugin scheme.

According to an aspect of the present invention, a method for providing applications in a web page is provided. The method includes receiving a request for accessing web content from a user device, in which the request comprises information associated with the user device, obtaining one or more applications from one or more application stores based on the information associated with the user device, and rendering the one or more application obtained from the one or more application stores along with the web content in the web page such that the one or more applications are displayed in conjunction with the web content in the web page.

According to another aspect of the present invention, a system is provided, which includes a plurality of user devices, each of the plurality of the user devices is configured to send a request for accessing web content to a host server; a plurality of application stores, each of the plurality of the application stores is configured to provide one or more applications; a web server configured to deliver the web content as requested by a user device among the plurality of the user devices; and the host server is configured to: receive the request for accessing the web content from the user device, wherein the request comprises information associated with the user device; obtain the one or more applications from one or more application stores based on the information associated with the user device; and render the one or more applications obtained from the one or more application stores along with the web content on a web page such that the one or more applications are displayed in conjunction with the web content in the web page.

According to another aspect of the present invention, an apparatus for providing applications in a web page is provided. The apparatus include a processor and a memory coupled to the processor, in which the processor configured to: receive a request for accessing web content from a user device, in which the request includes information associated with the user device; obtain one or more applications from one or more application stores based on the information associated with the user device; and render the one or more applications obtained from the one or more application stores along with the web content in the web page such that the one or more applications are displayed in conjunction with the web content in the web page.

BRIEF DESCRIPTION OF THE DRAWINGS

The above and other aspects, features and advantages of embodiments of the present invention will be more apparent from the following description, taken in conjunction with the accompanying drawings, in which:

FIG. 1B illustrates a communication system for providing applications in a rendered output of a web page, according to another embodiment of the present invention;

Throughout the drawings, like reference numerals will be understood to refer to like parts, components, and structures.

DETAILED DESCRIPTION OF EMBODIMENTS OF THE PRESENT INVENTION

Figure 1A:
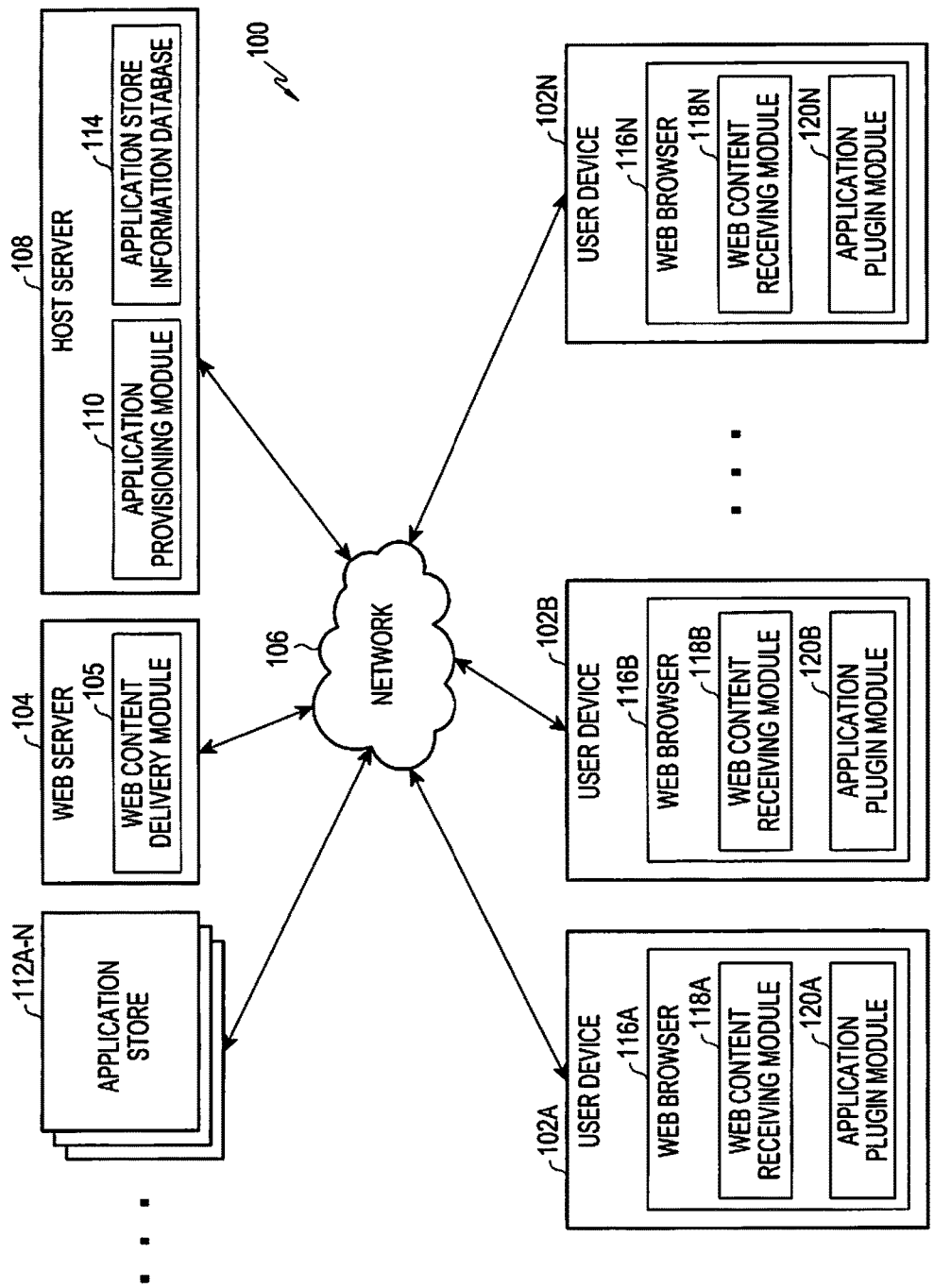
FIG. 1A illustrates a communication system for providing applications in a rendered output of a web page, according to an embodiment of the present invention.

Hereinafter, embodiments of the present invention are described in detail with reference to the accompanying drawings. Detailed descriptions of well-known functions and structures incorporated herein will be omitted to avoid obscuring the subject matter of the present invention.

As the present invention allows for various changes and numerous embodiments, particular embodiments will be illustrated in the drawings and described in detail. However, the present invention is not limited to the specific embodiments and should be construed as including all changes, equivalents, and substitutions included in the spirit and scope of the present invention.

Although ordinal numbers such as "first", "second", and so forth, will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a commonly used dictionary have meanings coinciding with those of terms in the related technology. As long as the terms are not defined obviously, they are not ideally or excessively analyzed as formal meanings.

In the following description, a detailed description of known functions and configurations incorporated herein has been omitted for clarity and conciseness. Terms used herein are defined based on functions in the present invention and may vary according to users or operators' intention or usual practices. Therefore, the definition of the terms should be made based on contents throughout the specification.

The present invention describes a method and apparatus for providing applications in a rendered output of a webpage. In the following detailed description of the embodiments of the invention, reference is made to the accompanying drawings that form a part hereof, and in which are shown by way of illustration of specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims and their equivalents.

An application includes a software program designed to run on smartphones, tablets, computers, etc. The application is made available through an application distribution platform, which are typically operated by the owner of the mobile operating system. Some of the mobile operating systems include Google Play, Windows Phone store, Blackberry app world, etc. Usually, the application may be displayed as an icon/plugin on a web site associated with the owner of the mobile operating system. The application is then downloaded from the web site associated with the owner of the mobile operating system to a target device.

FIG. 1A illustrates a communication system 100 for providing applications in a rendered output of a webpage, according to an embodiment of the present invention. In FIG. 1A, the communication system 100 includes application stores 112A-N, user devices 102A-102N, a web server 104 and a host server 108. The application stores 112A-N, the client devices 102A-102N, the host server 108, and the web server 104 are connected via a communication network 106.

The user devices 102A-102N may include laptop, desktop, tablet, smartphone, mobile phone, phablet and so on. Each of the user devices 102A-102N includes a web browser as indicated by 116A-116N, respectively. Each of the web browsers 116A-116N includes a web content receiving module as indicated by 118A-118N, respectively, and an application plugin module as indicated by 120A-120N, respectively. The host server 108 includes an application provisioning module 110 and an application store information database 114. The communication network 106 may be Wireless Local Area Network (WLAN), Local Area Network (LAN), Global System for Mobile Communications (GSM), Enhanced Data for Global Evolution (EDGE), General Packet Radio Service (GPRS), Wireless Fidelity (Wi-Fi), Worldwide Interoperability for Microwave Access (Wi-MAX), Wireless Gigabit Alliance (WiGig), etc.

If a user device 102A wishes to access content in a web server 104, the user device 102A sends a uniform resource locator (URL) request to the web server 104 via a browser application. The URL request includes information about the user device 102A. The device information includes information regarding manufacturer of the device, operating system of the device, browser application used in the device, and the operator of the user device. After obtaining the URL request, the web server 104 forwards the request to the host server 108. The host server 108 in response to the request obtains one or more applications from one or more application stores 112A-N. The host server 108 determines one or more application stores 112A-N to select one or more applications. Accordingly, the host server 108 displays applications selected from the respective application stores 112A-N in a rendered output of a webpage.

FIG. 1B is similar in an operation as described in FIG. 1A except that the web server of FIG. 1B performs the operation of the host server of FIG. 1A in addition to the operation of the web server of FIG. 1A.

FIG. 1B illustrates a communication system 150 for providing applications in a rendered output of a webpage, according to another embodiment of the present invention.

The web server 104 includes an application provisioning module 110, a web content delivery module 105, and an application store information database 114. The web server 104 determines one or more application stores 112A-N to choose and display the application plugin along with web content in the rendered output of the webpage. In another embodiment of the present invention, the web server 104 may inform the application stores 112A-N to directly provide applications to the user device 102 via the network 106.

Figure 2:
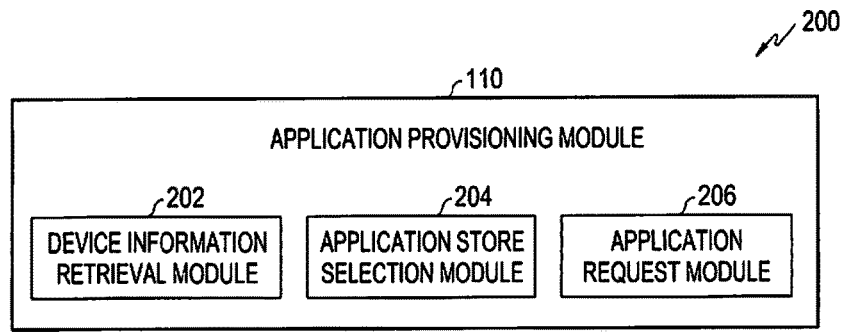
FIG. 2 illustrates in detail an application provisioning module shown in FIG. 1A and FIG. 1B, according to an embodiment of the present invention.

FIG. 2 illustrates in detail the application provisioning module shown in FIG. 1A and FIG. 1B, according to an embodiment of the present invention.

As shown in FIG. 2, the application provisioning module 110 consists of a device information retrieval module 202, an application store selection module 204, and an application request module 206.

The device information retrieval module 202 is configured for retrieving information associated with the user device 102 (i.e., device information). The device information includes information regarding manufacturer of the device, operating system of the device, browser application used in the device, and the operator of the user device. Based on the device information, one or more application stores are selected by the application store selection module 204. In an embodiment of the present invention, the web server 104 decides to choose one or more application stores 112A-N. In another embodiment of the present invention, the host server 108 decides to choose one or more application stores.

The application store selection module 204 is configured for selecting one or more applications from the one or more application stores 112A-N. The one or more applications are selected by determining a type of applications available in the one or more application stores 112A-N. The types of applications may include free applications, paid applications, trending applications, application store recommended applications, user account recommended applications, contextual applications, social recommended applications, etc. The free applications can be downloaded from the application store at free of cost. Many of the users who download free applications cannot enjoy all the features of the application. Some free applications may be restricted to validity or full version may not be available. Also, games related applications are provided free for few levels only. Therefore, users have to pay for subscribing the paid applications to access all the levels. Different subscriptions schemes may be provided to the user for subscribing the paid applications. Users can choose either monthly or yearly subscription to access the paid applications. The user can pay for the paid applications or certain levels thereof within the application or through a website. There are multiple payment options available to the user. Examples of the payment options include, but are not limited to, credit card, debit card, internet banking account, Paypal, and Google checkout. The trending applications are an application according to the current trend prevailed in the market.

The application store recommended applications are the applications that are suggested by the application store based on ratings of the applications, user preferences, etc. The user account recommended applications are listed based on the browser through which user account is signed in by the user. For example, if the user is using "Browser A", then applications related to developer of "Browser A" will be listed to the user. The contextual applications are listed based on the context. For example, if the user is typing a webpage URL such as www.abc.com, then applications related to "abc" will be listed to the user. Further, if location related information are retrieved, location based applications are also listed to the user. The social recommended applications are listed based on the social network account signed in by the user. For example, if the user is logged in to a social Network A, applications installed by one or more of user's friends, applications liked by friends, and applications liked by friends of friends in the social Network A are listed. Accordingly, the one or more applications used by the user's friend are also displayed along with web content in the webpage.

The application request module 206 requests an access to one or more application stores to retrieve the selected one or more applications. The 30 application request module 206 comprises an inline frame such as an HTML iframe for sending a request to the one or more application stores 112A-N. Based on the request, the one or more application stores display one or more applications. The iframe may contain a code corresponding to each application store. Based on the device information and other criteria, the iframe embeds the one or more applications retrieved from the one or more application stores in the form of plugins and is displayed on the webpage.

In an embodiment of the present invention, if the application store receives many requests from plurality of devices, then selection of one or more applications is based on priority, tie-up with web servers, etc. Table 1 illustrates an exemplary categorization of parameters that affects in selecting a particular application store.

TABLE 1

| Device Manufacturer | Platform | Browser | Operator/ Open Market | App store Decision |
|---|---|---|---|---|
| Device A | Platform A | Browser A | Operator A | App store A |
| Device B | Platform B | Browser B | Operator B | App store B |
| Device C | Platform C | Browser C | Operator C | App store C |
| ... | ... | ... | ... | ... |
| Device N | Platform N | Browser N | Operator N | App store N |

In an embodiment of the present invention, the device manufacturer of the user device is "Device A" and a web server may receive a request (for example, a request for an access to an application store) from a user device. Once the request is received, the information associated with the "Device A" such as an operating system (OS) version of the user device as "Platform A", a type of a browser used as "Browser A", an operator of the device as "Operator A" are retrieved. Based on the above information, the web server decides to select "Application store A" to obtain one or more applications from "Application store A".

Figure 3:
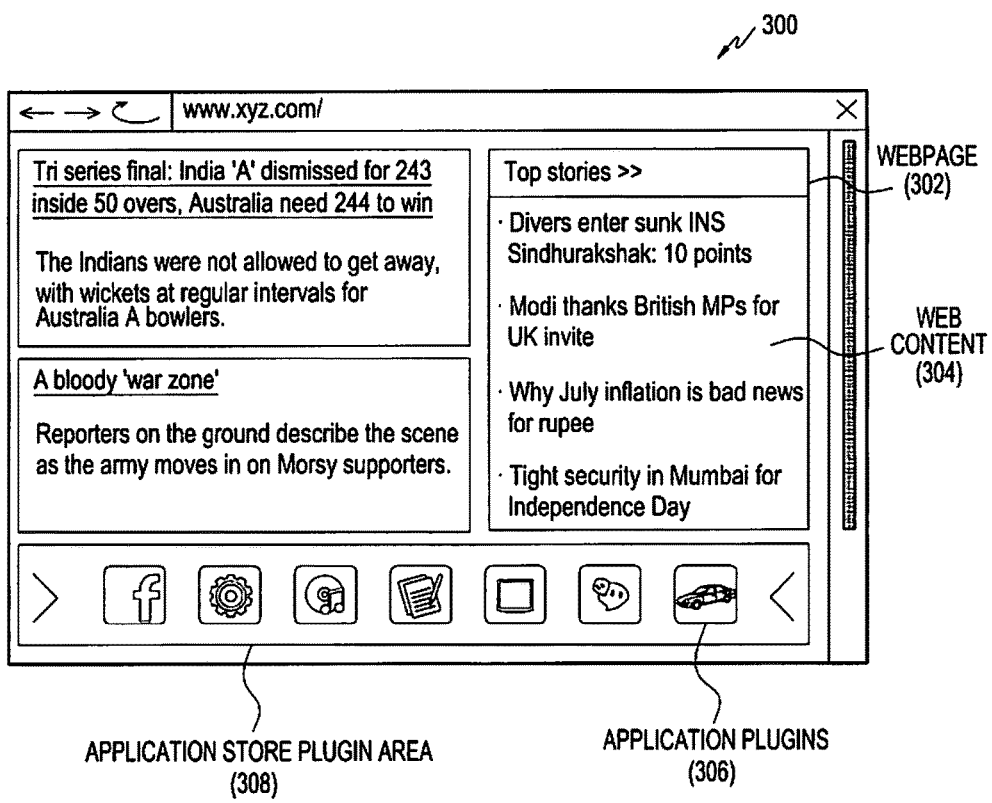
FIG. 3 illustrates a web page on which web content is rendered along with application plugins, according to an embodiment of the present invention.

FIG. 3 illustrates a webpage rendering web content along with applications plugins on a web page, according to an embodiment of the present invention.

Assuming that a user wishes to access a news page of a third party web site, the user sends a URL request from the user device via a web browser to a web server. As shown in FIG. 3, the web server provides the requested news page (e.g., web content 304) along with one or more application plugins 306 as a rendered output of a webpage 302. Also, the one or more application plugins 306 are displayed in application store plugin area 308 of the web page 302.

FIGS. 4A to 4D illustrate rendering one or more applications on a webpage based on information associated with a user device, according to an embodiment of the present invention.

Figure 4A:
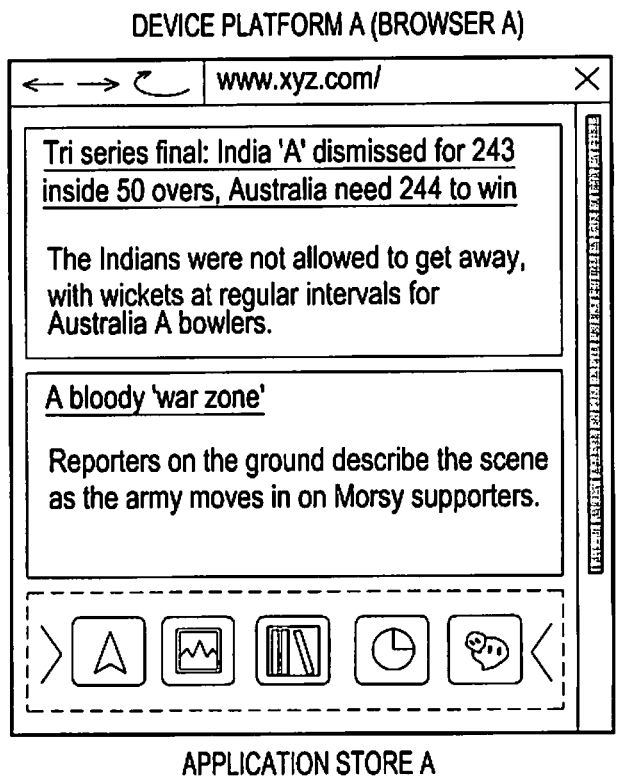
FIGS. 4A to 4D are screenshots view depicting rendering one or more applications on a web page based on information associated with a user device, according to an embodiment of the present invention.
Figure 4B:
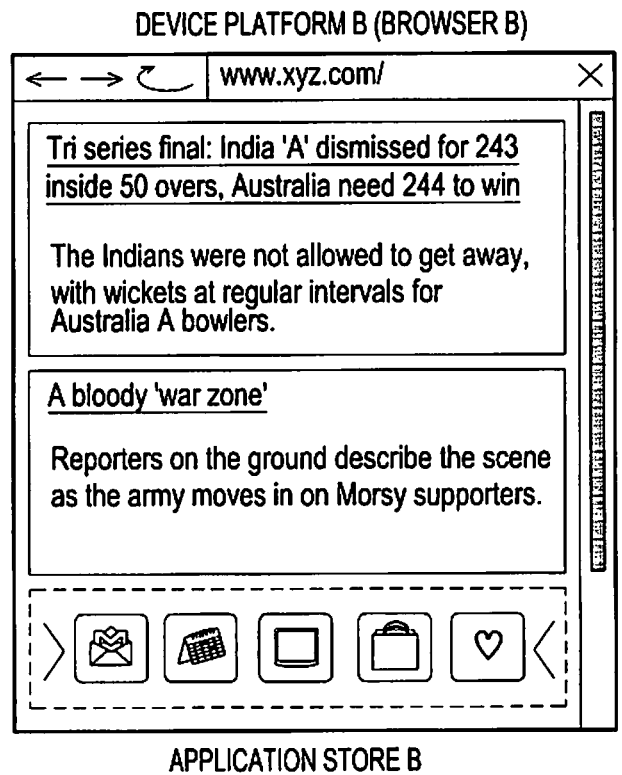
Figure 4C:
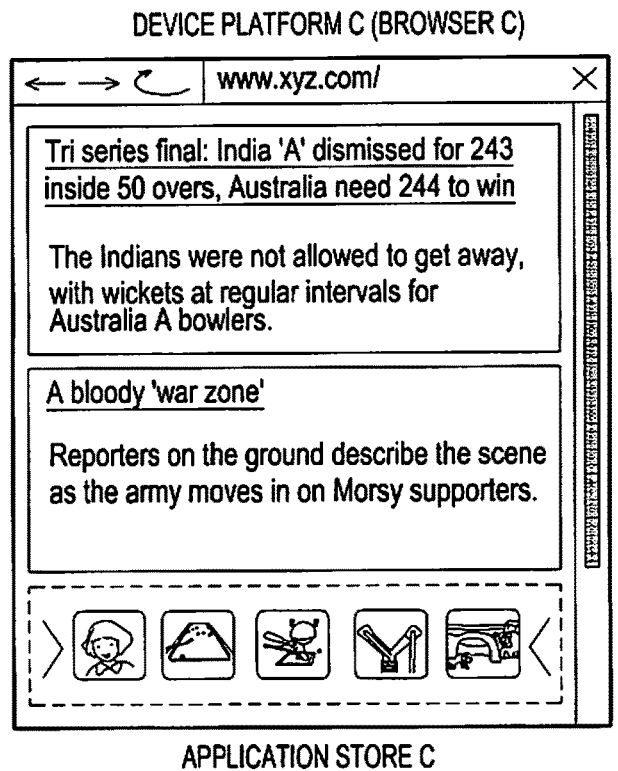
Figure 4D:
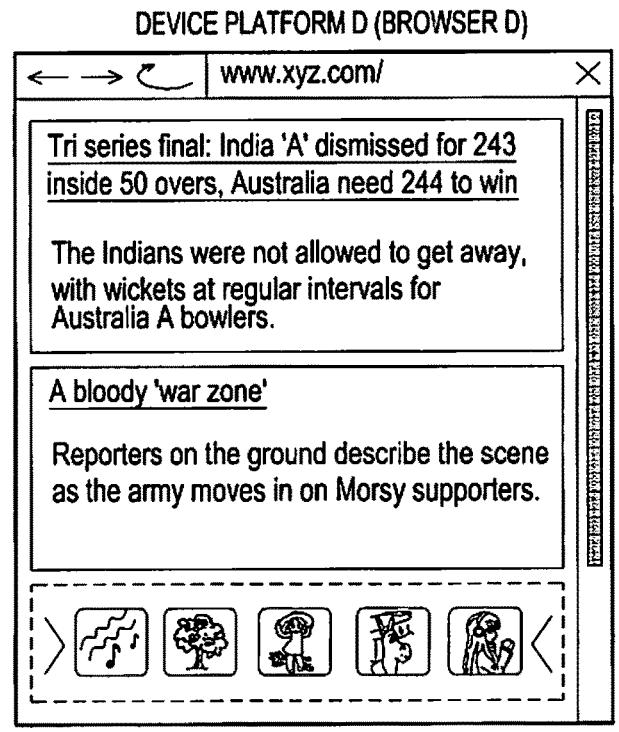

In an embodiment of the present invention, the host server receives a URL request from the user device for accessing web content. The host server retrieves information associated with the user device such as the operating system version of the user device and the type of the browser used for accessing the web content. Based on the user device information, the host server selects one or more application stores to display one or more applications on a web page along with web content. For example, assuming that the operating system version of the user device is "Device A" and the type of the browser is "Browser A", the host server based on the above information lists one or more applications as shown in FIG. 4A. Similarly, different types of applications displayed for different device platforms and browser types are shown in FIGS. 4B to 4D respectively. In some embodiments of the present invention, the one or more applications selected from the one or more application stores may include a cross platform application using HTML5. The cross platform application is very compatible irrespective of device platform and can be run on any device. For example, user defined information such as contact files can be stored as a HTML5 file and can be run on any device irrespective of the device platform.

Figure 5:
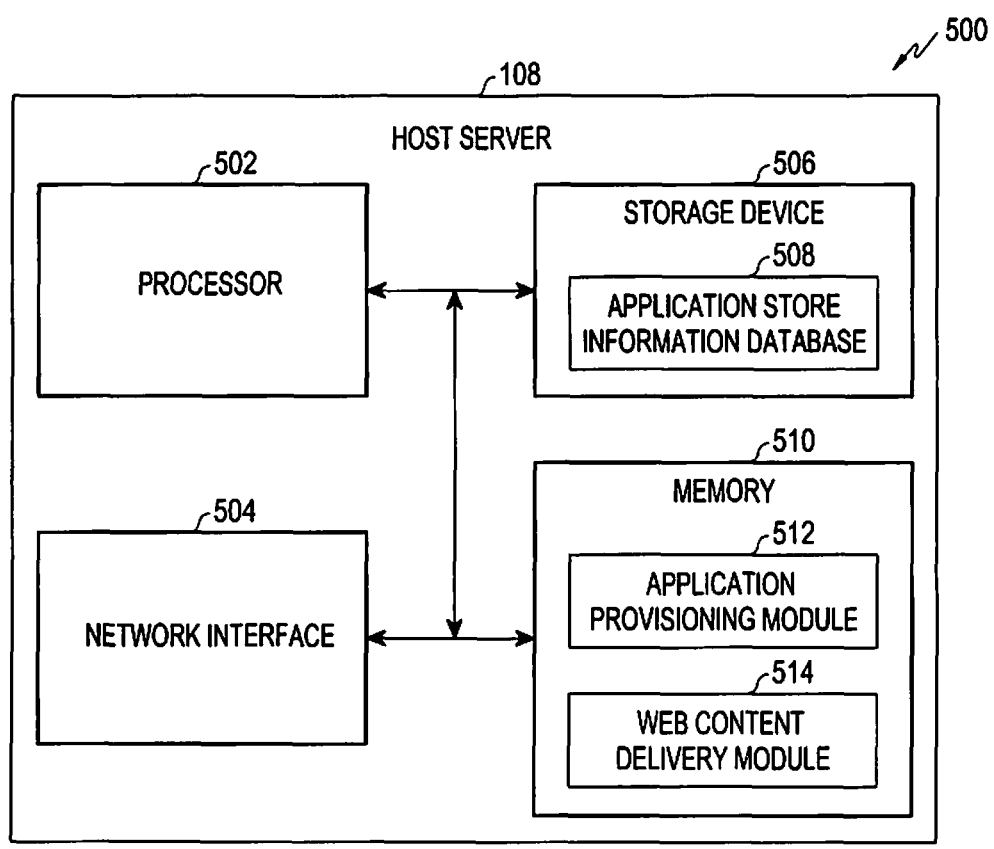
FIG. 5 illustrates a host server capable of providing applications in a rendered output of a web page, according to an embodiment of the present invention.

FIG. 5 illustrates a host server 108 capable of providing applications in a rendered output of a webpage, according to an embodiment of the present invention. In FIG. 5, the host server 108 includes one or more processors 502, a network interface 504, a storage device 506, and a memory 510. The storage device 506 includes an application store information database 508. The memory 510 includes an application provisioning module 512 and a web content delivery module 514.

The processor 502 is configured to implement functionality and/or process instructions for execution within the host server 108. The processor 502 is capable of processing instructions stored in the memory or instructions stored in the storage device 506. The processor 502 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor 502 may be embodied as software, firmware, hardware, or any combination thereof.

The storage device 506 may include one or more computer-readable storage media. The storage device 506 may include non-volatile storage elements. Examples of such non-volatile storage elements may include magnetic hard discs, optical discs, floppy discs, flash memories, or forms of electrically programmable memories (e.g., electrically programmable read only memory (EPROM)) or electrically erasable and programmable memories (e.g., electrically erasable and programmable read only memory (EEPROM)). In addition, the storage device 506 may be considered as a non-transitory computer-readable storage medium. The term "non-transitory" may indicate that the storage medium is not embodied in a carrier wave or a propagated signal. However, the term "non-transitory" should not be interpreted to mean that the storage device is non-movable. In some examples, the storage device 506 may be configured to store larger amounts of information than the memory 506. In some examples, a non-transitory storage medium may store data that can change over time (e.g., in Random Access Memory (RAM) or cache).

The memory 510 is configured to store information within the host server 108 during the operation. The memory 510 may include a computer-readable storage medium. The memory may include a volatile memory, meaning that the memory 510 does not maintain stored contents when the computer is turned off. Examples of volatile memories include random access memories (RAM), dynamic random access memories (DRAM), static random access memories (SRAM), and other forms of volatile memories known in the art. In some examples, the memory 510 may be used to store program instructions for execution by processor 502. For example, the memory 510 includes the application provisioning module 512 and web content delivery module 514 stored in the form of executable program instructions, which, when executed by the processor 502, cause the processor 502 to perform the method steps illustrated in FIG. 5.

The host server 108 utilizes network interface 504 to communicate with external devices (e.g., a location-based service (LBS) server) via one or more networks, such as one or more wireless networks. The network interface 504 may include a network interface card, such as an Ethernet card, an optical transceiver, a radio frequency transceiver, or any other type of device that can send and receive information. Examples of such network interfaces may include Bluetooth®, Third Generation (3G), Fourth Generation (4G), Fifth Generation (5G) and WiFi® radios in the user device as well as Universal Serial Bus (USB). In some examples, the web server 104 may utilize the network interface 504 to wirelessly or wiredly communicate with an external device such as a server, mobile terminal, or other electronic devices connected through the network.

In an embodiment of the present invention, the application provisioning module 512 and the web content delivery module 514 may be included in a web server 104. In this case, the web server 104 decides to choose an application store from one or more application stores to display one or more applications on the display of the user device.

Figure 6:
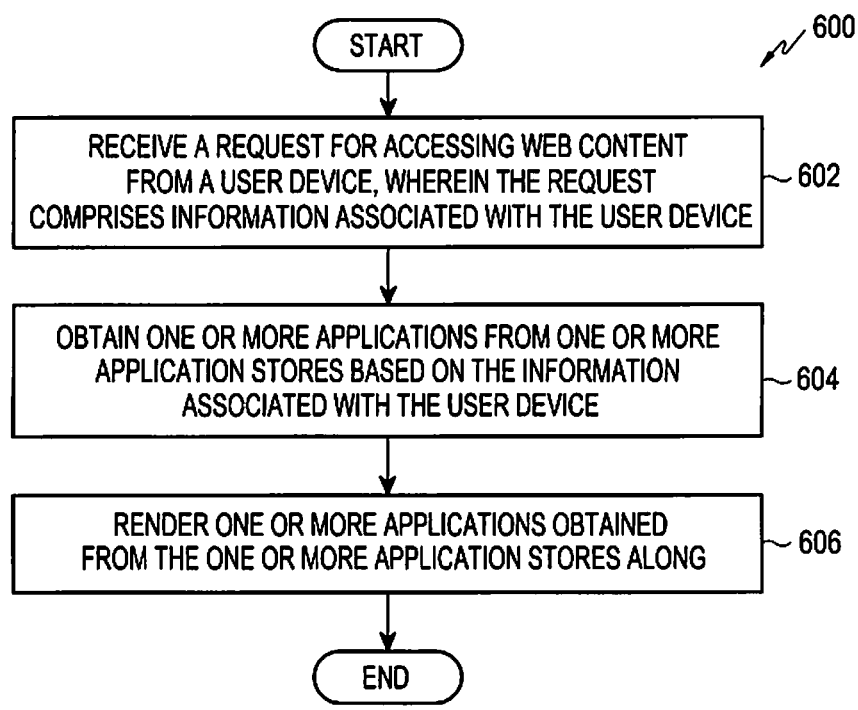
FIG. 6 is a flowchart illustrating a method of providing applications in a rendered output of a web page, according to an embodiment of the present invention.

FIG. 6 is a flowchart illustrating a method of providing applications in a rendered output of a web page, according to an embodiment of the present invention.

At step 602, a request for accessing web content residing on a third party web server is received from a user device. The request comprises information associated with the user device. For example, the information includes an operating system version of the user device, a type of a browser application, a type of a service operator, and a device manufacturer of the user device.

Using the information associated with the user device, at step 604, the web server obtains one or more applications from one or more application stores. The one or more applications are obtained according to determined application types. The various types of applications are selected from a group comprising free applications, paid applications, trending applications, application store recommended applications, user account recommended applications, contextual applications, and social recommended applications.

At step 606, one or more applications obtained from the one or more application stores are rendered along with the web content in the webpage. The one or more applications are rendered as application plugins displayed at the bottom of the webpage. Once the user clicks the application plugin, the webpage is promptly redirected to the application store webpage so as to download the application.

The embodiments of the present invention have been described with reference to specific embodiments; it will be evident that various modifications and changes may be made to these embodiments without departing from the spirit and scope of the present invention. Furthermore, the various devices, modules, and the like, described herein may be enabled and operated using hardware circuitry, for example, complementary metal oxide semiconductor based logic circuitry, firmware, software, and/or any combination of hardware, firmware, and/or software embodied in a machine readable medium. For example, the various electrical structures and methods may be embodied using transistors, logic gates, and electrical circuits, such as application specific integrated circuits.

According to the present invention, an application/applications existing in an application store may be displayed on an external website, instead of the application store, by using a web plugin scheme to provide the application/applications to users, thereby improving user convenience.

Other effects that may be obtained or expected from the embodiments of the present invention are explicitly or implicitly disclosed in the detailed description of the embodiment of the present invention. For example, various effects expected from the embodiments of the present invention have been disclosed in the detailed description of the present invention.

While the present invention has been particularly shown and described with reference to certain embodiments thereof, various changes in form and detail may be made therein without departing from the spirit and scope of the present invention as defined by the following claims. Accordingly, the scope of the present invention will be defined by the appended claims and equivalents thereto.

What is claimed is:

1. A method for controlling a user device, the method comprising:
    transmitting a request for accessing web content associated with a URL included in the request to a web server, wherein the request for accessing web content associated with the URL comprises information associated with the user device, the request for accessing web content associated with the URL being forward from the web server to another server for selecting one or more applications corresponding to the information associated with the user device;
    receiving a response including the web content associated with the URL and information regarding the one or more applications corresponding to the information associated with the user device which are obtained from one or more application stores based on the information associated with the user device, the one or more applications being selected by the other server, from a plurality of applications which are stored in the one or more application stores based on the information associated with the user device, wherein the information regarding the one or more applications includes information regarding one or more icons of the one or more applications; and
    displaying the one or more icons regarding the one or more applications along with the web content associated with the URL.

2. The method of claim 1, wherein the information associated with the user device comprises at least one of information of an operating system version of the user device, a type of a browser, a type of a service operator, and a device manufacturer of the user device.

3. The method of claim 1, wherein displaying the information regarding the one or more applications along with the web content associated with the URL comprises:
    displaying application plugins associated with the one or more applications along with the web content in a web page.

4. A method for controlling a web server, the method comprising:
    receiving a request for accessing web content associated with a URL included in the request from a user device, wherein the request for accessing web content associated with the URL comprises information associated with the user device, the request for accessing web content associated with the URL being forward from the web server to another server for selecting one or more applications corresponding to the information associated with the user device;
    obtaining information regarding the one or more applications from one or more application stores based on the information associated with the user device, the one or more applications being selected by the other server, from a plurality of applications which are stored in the one or more application stores based on the information associated with the user device, wherein the information regarding the one or more applications includes information regarding one or more icons of the one or more applications;
    transmitting a response including the web content associated with the URL and the information regarding the one or more applications corresponding to the information associated with the user device to the user device.

5. The method of claim 4, further comprising:
    determining a type of the one or more applications which are displayed along with the web content on a display of the user device.

6. The method of claim 4, further comprising:
    displaying application plugins associated with the one or more applications along with the web content associated with the URL.

7. An apparatus for providing applications in a web page, the apparatus comprising:
    a processor; and
    a memory coupled to the processor,
    wherein the processor is configured to:
    transmit a request for accessing web content associated with a URL included in the request to a web server, wherein the request for accessing web content associated with the URL comprises information associated with the user device, the request for accessing web content associated with the URL being forward from the web server to another server for selecting one or more applications corresponding to the information associated with the user device;
    receive a response including the web content associated with the URL and information regarding the one or more applications corresponding to the information associated with the user device which are obtained from one or more application stores based on the information associated with the user device, the one or more applications being selected by the other server, from a plurality of applications which are stored in the one or more application stores based on the information associated with the user device, wherein the information regarding the one or more applications including information regarding one or more icons of the one or more applications; and
    display the one or more icons regarding the one or more applications along with the web content associated with the URL.

8. The apparatus of claim 7, wherein the processor is further configured to determine a type of the one or more applications which are displayed along with the web content on a display of the user device.

9. The apparatus of claim 7, wherein the processor is further configured to display application plugins associated with the one or more applications along with the web content associated with the URL.

10. The apparatus of claim 7, wherein the memory comprises an application provisioning module stored in a form of being executable by the processor.

* * * * *